(12) United States Patent
Krätschmer et al.

(10) Patent No.: US 8,827,635 B2
(45) Date of Patent: Sep. 9, 2014

(54) TURBINE HOUSING FOR AN EXHAUST GAS TURBOCHARGER OF AN INTERNAL COMBUSTION ENGINE

(75) Inventors: Stephan Krätschmer, Schwäbisch Gmünd (DE); Paul Löffler, Stuttgart (DE); Markus Müller, Waiblingen (DE); Siegfried Sumser, Stuttgart (DE)

(73) Assignee: Daimler AG, Stuttgart (DE)

( * ) Notice: Subject to any disclaimer, the term of this patent is extended or adjusted under 35 U.S.C. 154(b) by 956 days.

(21) Appl. No.: 12/927,870

(22) Filed: Nov. 27, 2010

(65) Prior Publication Data

US 2011/0091318 A1   Apr. 21, 2011

Related U.S. Application Data

(63) Continuation-in-part of application No. PCT/EP2009/004431, filed on Jun. 19, 2009.

(30) Foreign Application Priority Data

Jul. 5, 2008 (DE) .......................... 10 2008 032 492

(51) Int. Cl.
   *F01D 25/28* (2006.01)
   *F01D 17/16* (2006.01)
   *F02C 6/12* (2006.01)

(52) U.S. Cl.
   CPC ............. *F02C 6/12* (2013.01); *F05D 2220/40* (2013.01); *F05D 2300/50212* (2013.01); *F01D 17/16* (2013.01); *F05D 2240/14* (2013.01); *F05D 2230/50* (2013.01); *F05D 2230/61* (2013.01)
   USPC ....... 415/159; 415/196; 415/213.1; 415/214.1

(58) Field of Classification Search
   USPC .............. 415/151, 159, 165, 168.2, 183, 184, 415/185, 186, 191, 196, 203, 204, 208.1, 415/208.2, 208.3, 209.2, 211.1, 212.1, 415/213.1, 214.1, 229
   See application file for complete search history.

(56) References Cited

U.S. PATENT DOCUMENTS

2,822,974 A   4/1954   Mueller
2,801,043 A   8/1954   Spotz et al.
(Continued)

FOREIGN PATENT DOCUMENTS

DE   39 07 504   9/1989
DE   10 2006 053 332   5/2008
(Continued)

OTHER PUBLICATIONS

JP 2007192180 A—Machine Translation.*

*Primary Examiner* — Edward Look
*Assistant Examiner* — Juan G Flores
(74) *Attorney, Agent, or Firm* — Klaus J. Bach

(57) ABSTRACT

In a turbine housing for an exhaust gas turbocharger of an internal combustion engine with at least one spiral channel, which can be coupled into an exhaust gas flow of an exhaust tract of the internal combustion engine, and a receiving space for a turbine wheel which is disposed downstream of the at least one spiral channel and can be acted upon by the exhaust gas of the internal combustion engine passing through the at least one spiral channel of the turbine housing, there is at least one partial housing including the at least one spiral channel, and a housing module which is fastened to the partial housing and has a vane structure disposed upstream of the receiving space which also includes an attachment surface for a bearing section of the exhaust gas turbocharger. The invention also resides in an exhaust gas turbocharger with such a turbine housing as well as to a method for producing such a turbine housing.

11 Claims, 5 Drawing Sheets

(56) References Cited

U.S. PATENT DOCUMENTS

| | | | |
|---|---|---|---|
| 3,099,385 A | | 7/1963 | Elford |
| 5,522,697 A | * | 6/1996 | Parker et al. ............... 415/158 |
| 6,945,046 B2 | * | 9/2005 | Allmang et al. ............... 60/602 |
| 8,047,772 B2 | * | 11/2011 | Petitjean et al. ............... 415/158 |

FOREIGN PATENT DOCUMENTS

| | | |
|---|---|---|
| EP | 1 420 152 | 5/2004 |
| GB | 925 984 | 9/1961 |
| GB | 925 984 | 5/1963 |
| JP | 62-154240 | 3/1987 |
| JP | 62-154240 | 9/1987 |
| JP | 63 143326 | 6/1988 |
| JP | 63143326 | 6/1988 |
| JP | 01227803 | 9/1989 |
| JP | 4-1313 | 1/1992 |
| JP | 2005226470 | 8/2005 |
| JP | 2007 192124 | 8/2007 |
| JP | 2007 192180 | 8/2007 |
| JP | 2007192124 | 8/2007 |
| JP | 2007192180 A * | 8/2007 |

* cited by examiner

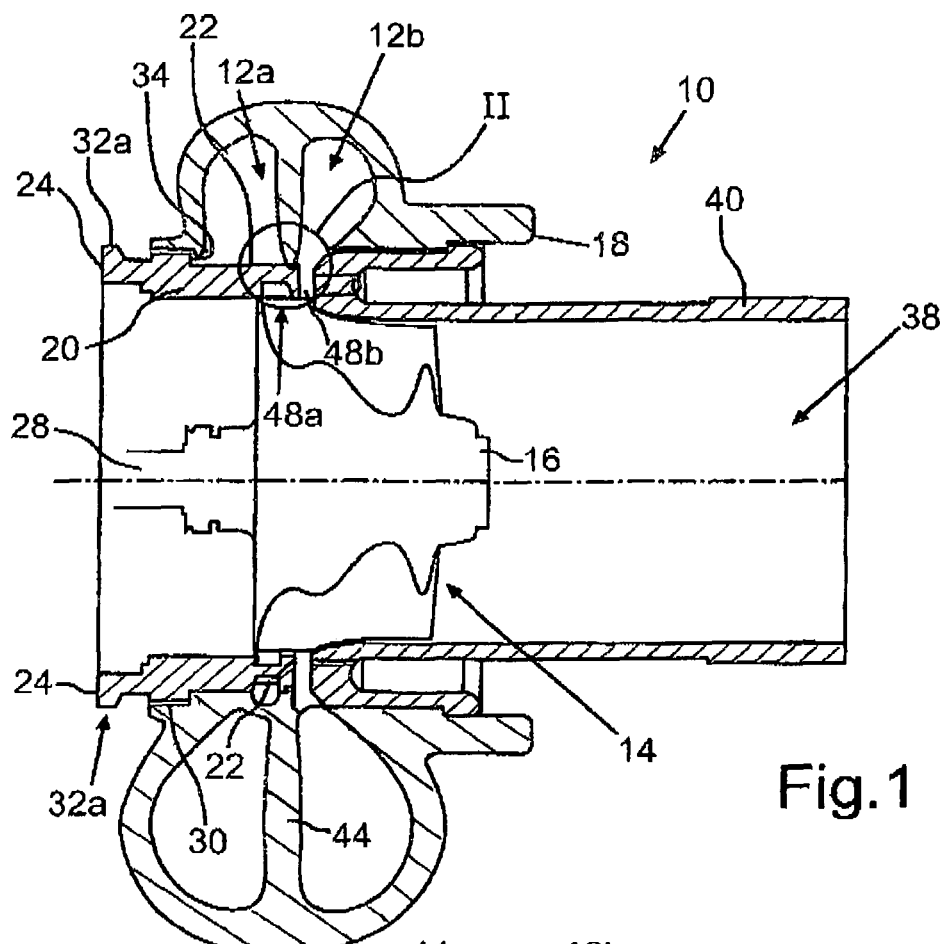
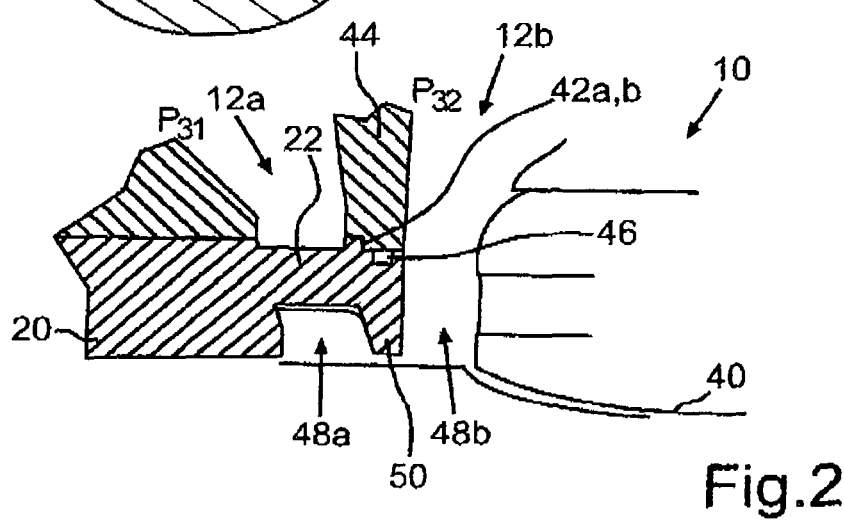
Fig.1
Fig.2

TURBINE HOUSING FOR AN EXHAUST GAS TURBOCHARGER OF AN INTERNAL COMBUSTION ENGINE

This is a Continuation-In-Part Application of pending international patent application PCT/EP2009/004431 filed Jun. 19, 2009 and claiming the priority of German patent application 10 2008 032 492.2 filed Jul. 5, 2008.

BACKGROUND OF THE INVENTION

The invention relates to a turbine housing for an exhaust gas turbocharger of an internal combustion engine including at least one spiral channel structure, and to an exhaust gas turbocharger including such a turbine housing as well as to a method for producing a turbine housing for an exhaust gas turbocharger.

Due to the continuous tightening of the emission limit values, for example the $NO_x$ and soot emission values, the demands on exhaust gas turbochargers or charged internal combustion engines also increase. Thus, for example, there are growing demands with regard to the charge pressure over the medium to high load operations of the internal combustion engine, as a result of which exhaust gas turbochargers have to be decreased more and more in size. The required high turbine performances of exhaust gas turbochargers are in other words realized by an increase of the back pressure capability or by the reduction of the flow volume reserve of the exhaust gas turbochargers in cooperation with the respective internal combustion engine, which however leads to low efficiencies. A further influencing of the performance of exhaust gas turbochargers occurs by exhaust gas after-treatment systems arranged in the exhaust gas tract downstream of the turbine as for example soot filters, catalysts or SCR systems. These exhaust gas after-treatment systems lead to a pressure increase at an exhaust gas outlet of the turbine housing or of the exhaust gas turbocharger. This again leads to a reduction of the turbine pressure drop describing the performance of the exhaust gas turbocharger. The turbine pressure drop can be determined as the quotient of a pressure in front of the turbine wheel or an exhaust gas inlet of the turbine housing and a pressure behind the turbine wheel or an exhaust gas outlet of the turbine housing. Also for this reason, the turbine size has to be designed for smaller flow-through values and thus for lower efficiencies in order to be able to satisfy the performance requirement of the compressor side of the exhaust gas turbocharger. A certain improvement in particular for internal combustion engines with exhaust gas recirculation systems is hereby offered by conventional exhaust gas turbochargers, whose turbine housings comprise two spiral channels through which exhaust gas can flow independently and that are usually formed in an asymmetric manner. The spiral channels are respectively coupled to different exhaust gas lines of an exhaust gas tract of the internal combustion engine. However, the spiral channels of these turbine housings have also reached spiral sizes in the meantime which result in very high flow losses by means of wall frictions and due to the small dimensions. Additionally, certain problems exist with regard to the exhaust gas recirculation capability in connection with the necessary combustion air of the internal combustion engine in particular in the lower to the medium speed range.

A particular problem resides in the fact that the known turbine housings or the exhaust gas turbochargers provided with these housings have to be adapted in a constructively elaborate manner, in order to be able to be utilized with satisfactory efficiencies for different types of internal combustion engines. Hereby, large production, storage holding and part costs are encountered.

It is thus the object of the present invention to provide a turbine housing or an exhaust gas turbocharger with such a turbine housing, which can be adapted in a simple and cost-efficient manner to different types of internal combustion engines.

SUMMARY OF THE INVENTION

In a turbine housing for an exhaust gas turbocharger of an internal combustion engine with at least one spiral channel, which can be coupled into an exhaust gas flow of an exhaust tract of the internal combustion engine, and a receiving space for a turbine wheel which is disposed downstream of the at least one spiral channel and can be acted upon by the exhaust gas of the internal combustion engine passing through the at least one spiral channel of the turbine housing, there is at least one partial housing including the at least one spiral channel, and a housing module which is fastened to the partial housing and has a vane structure disposed upstream of the receiving space which also includes an attachment surface for a bearing section of the exhaust gas turbocharger. The invention also resides in an exhaust gas turbocharger with such a turbine housing as well as to a method for producing such a turbine housing.

By means of such a modular construction of the turbine housing, a flexible construction kit is provided, where the different demands of different internal combustion engines can be accommodated in a particularly simple manner by a suitable choice of a respective housing module having a different vane structure. Additionally, a flexible thermodynamic influencing with corresponding efficiency increases of the associated exhaust gas turbocharger or of the internal combustion engine is made possible hereby. In contrast to the state of the art the turbine housing and the turbine wheel to be arranged therein can be essentially the same for engines in a broad displaced volume range as the turbine behavior, or the behavior of the charged internal combustion engine, can now be optimized by the choice and assembly of a respectively optimal housing module in a desired manner.

It has thereby been shown to be advantageous if the housing module is screwed to the partial housing and/or is press-fitted to the partial housing. With the help of a screw connection, a simple, cost-efficient and operation-safe position fixation is achieved. Alternatively or additionally, a press-fit offers the advantage that, in addition to the fastening, a high sealing quality between the partial housing and the In an advantageous arrangement of the invention it is provided that the partial housing and/or the housing module comprises a connection flange preferably in the area of the attachment surface, which flange is formed corresponding to a connection flange of the bearing surface. A simple connection of the bearing section to the turbine housing is achieved hereby, wherein the bearing section may be supported by the turbine housing. A connection flange arranged at the partial housing thereby makes a simple attachment and connection of the bearing section and an additional position fastening of the housing module possible by means of pressure forces exerted by the bearing housing. By means of a connection flange arranged at the housing module, the turbine housing can be connected to different bearing sections in a particularly flexible manner, as the partial housing can be formed unchanged in a constructive manner and only the appropriate housing module has to be selected.

In a further advantageous embodiment of the invention the housing module and/or the partial housing is formed as a cast part, in particular as a fine cast part and/or as a sand cast part. The requirements regarding the necessary manufacture precisions and the production costs can hereby be considered in an optimum manner. In this way, the housing module which includes the vane structure influencing the flow, may be formed as a higher quality and more precise fine cast part, whereas the partial housing is may consist of a relatively coarse but cost-efficient sand cast part.

Further advantages are obtained in that the turbine housing may easily comprise a further spiral channel that can be coupled to the exhaust gas flow of the internal combustion engine. Different operating regions of the internal combustion engine or of the exhaust gas turbocharger can hereby be operated in a more variable manner and the kinetic energy of the exhaust gas flow can be utilized in a better manner, so that altogether the efficiency increases significantly.

It has thereby been found to be advantageous in a further embodiment if the vane structure of the housing module is arranged between the further spiral channel and the turbine wheel receiving space. In other words, the housing module and the partial housing are adapted to each other in such a manner that the louver is arranged in the region of an exhaust gas outlet of the spiral channel, whereby an optimal flow influencing is made possible. It can thereby be provided that the housing module forms a nozzle of the spiral channel.

It is another advantage that the housing module for sealing the spiral channels with regard to each other comprises a sealing surface, which cooperates with a sealing surface of an intermediate wall of the partial housing arranged between the spiral channels. A complete gas tightness of the spiral channels with regard to each other can be ensured hereby, so that the exhaust gas flows through the spiral channels without thermodynamically damaging leakages.

In a further advantageous arrangement of the invention, that the sealing surface of the housing module is pressed to the sealing surface of the intermediate wall and/or that a sealing element, in particular a piston ring and/or a thermal compensation ring, is arranged between the sealing surfaces of the housing module and the intermediate wall. Hereby, temperature and geometry fluctuations occurring during the operation of the associated turbocharger can be compensated for in an advantageous manner and the desired gas tightness can be ensured reliably. This is for example of advantage with housings which are differently formed or housing modules of different materials whereby thermally induced movements between the individual components can be caused by different material pairings.

Preferably, a first heat expansion coefficient of a material of the housing module is larger than a second heat expansion coefficient of a second material of the partial housing and/or of the intermediate wall so that an expansion of the housing module with regard to the partial housing and/or the intermediate wall is obtained in a defined manner, which can effect a sealing. As the material of the housing module, an austenitic alloy based on Ni is particularly suitable and as the material of the partial housing and/or of the intermediate wall a usual sphere-graphitic gray cast iron may be chosen.

In an advantageous embodiment of the invention a further vane structure which is arranged between a spiral channel and the receiving space and axially adjustable with regard to a rotational axis of the turbine wheel and/or a flow element with a given inner contour is arranged in the region of the exhaust gas outlet of the turbine housing. This permits controlling the exhaust gas flow to the turbine wheel, so that the flexibility of the turbine housing according to the invention and its usability for different types of internal combustion engines can be increased further. By means of the adjustable vane structure, a so-called turbobrake functionality can for example be provided. The area of the exhaust gas outlet is particularly suitable because it offers the needed installation space.

A further aspect of the invention relates to an exhaust gas turbocharger for an internal combustion engine, wherein a simple and cost-efficient adaptability to different types of internal combustion engines is provided for according to the invention in that the turbine housing comprises at least one partial housing comprising the at least one spiral channel and a housing module fastened to the partial housing, which has a vane structure arranged upstream of the receiving space and an attachment surface, at which the bearing section is supported at least indirectly. The exhaust gas turbocharger has thus a modular construction, whereby a flexible construction kit is provided, where the different requirements of different internal combustion engines can be considered in a particularly simple manner by a suitable choice of a respective housing module provided with different louvers. Furthermore, a significant efficiency increase of the associated internal combustion engine is obtained compared to the state of the art due to the optimal adaptability. Further advantages can already be taken from the previous descriptions of the turbine housing according to the invention.

In a further advantageous embodiment of the invention it is provided that a heat shield is arranged between an end facing the bearing section and an end facing the housing module. The heat shield is provided so that the heat transfer to the bearing section by the turbine housing and by the exhaust gas is reduced. For a simple assembly, the heat shield is advantageously arranged between the bearing section and the housing module, whereby, with a connection of the housing module to the bearing module or of the turbine housing to the bearing module, a fixed fastening or a clamping of the heat shield is simultaneous effected between the bearing section and the and the housing module.

In an advantageous arrangement of the invention, the housing module and the bearing section comprise corresponding connection flanges and are fastened to each other by means of a tension band and/or a screw connection. By integrating the connection flange into the housing module, a particularly simple and flexible connection of the turbine consisting of the turbine housing and the turbine wheel and the bearing section, whereby the bearing section is supported by the turbine housing.

Further advantages are obtained if the partial housing of the turbine housing and the bearing have connection flanges corresponding to each other and are fastened to each other by means of a tension band and/or a screw connection. The housing module can be fixed in its position by tightening between the bearing section and the partial housing and pretension by the wedging effect of the tension band.

A further aspect of the invention relates to a method of producing a turbine housing for an exhaust gas turbocharger of an internal combustion engine, wherein a simple and cost-efficient adaptability to different types of internal combustion engines is made possible according to the invention in that at least the steps are carried out of providing a partial housing with at least one spiral channel that can be coupled to an exhaust gas flow of an exhaust gas tract of the internal combustion engine, with a receiving space arranged downstream of the at least one spiral channel for accommodating a turbine wheel, which can be acted upon by the exhaust gas flowing through the at least one spiral channel, choosing a housing module which has a vane structure and an attachment surface for a bearing section of the exhaust gas turbocharger, arranging the housing module at the partial housing, so that the vane structure of the housing module is arranged upstream of the receiving space, and fastening the housing at the partial housing. The method according to the invention provides for a simple and cost-efficient adaptability of the exhaust gas turbocharger to different types of internal combustion engines in contrast to the state of the art, as a turbine housing formed in a modular form is used and the respective optimal housing module is chosen and assembled depending on a respective internal combustion engine type. The preferred embodiments introduced in connection with the turbine housing and further developments and their advantages are correspondingly valid—as far as applicable—for the method according to the invention.

The invention will become more readily apparent from the following description of particular embodiments thereof with reference to the accompanying drawings, in which the same or functionally the same elements are provided with identical reference numerals:

BRIEF DESCRIPTION OF THE DRAWINGS

FIG. 1 shows schematically a turbine housing according to a first embodiment of the invention;

FIG. 2 is an enlarged schematic sectional view of the turbine housing showing the detail II of in FIG. 1;

DESCRIPTION OF PARTICULAR EMBODIMENTS

Figure 3:
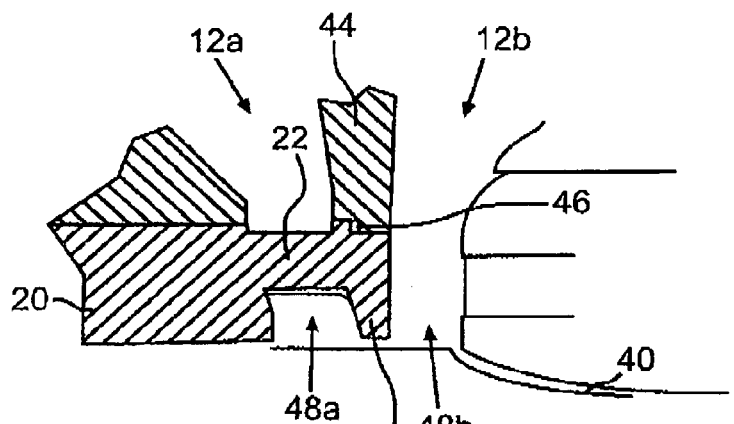
FIG. 3 is a schematic sectional view of a partial housing and of a housing module according to a second embodiment.

FIG. 1 shows a schematic lateral sectional view of a turbine housing 10 of an exhaust gas turbocharger (not shown) according to a first embodiment. The turbine housing 10 is in the form of a double-flow radial turbine and comprises two spiral channels 12a, 12b, which can be coupled to different exhaust gas flows of an exhaust gas tract of an associated internal combustion engine and through which exhaust gas flows can be conducted independently of each other. A receiving space 14 is disposed downstream of the two spiral channels 12a, 12b, in which space is arranged a turbine wheel 16, which can be acted upon by exhaust gas of the internal combustion engine supplied thereto via the spiral channels 12a, 12b. For adapting the turbine housing 10 or the exhaust gas turbocharger provided therewith in a simple and cost-efficient manner to different types to internal combustion engines, the turbine housing 10 has a partial housing 18 comprising the spiral channels 12a, 12b and a housing module 20 fastened to the partial housing 18. The housing module 20 on its part has a vane structure 22 arranged upstream of the receiving space 14 and an attachment surface 24 for a bearing section 26 (see FIG. 4) of the exhaust gas turbocharger. The bearing section 26 serves for supporting a shaft 28, via which the turbine wheel 16 is coupled to a compressor wheel in a rotationally fixed manner, which is arranged in a compressor housing (not shown) known per se of the exhaust gas turbocharger. The housing module 20 is fastened to the partial housing 18 via a screw connection 30 and comprises a connection flange 32a in the region of the attachment surface 32a, which flange is formed corresponding to a connection flange 32b (see FIG. 4) of the bearing section 26 for a constructively simple connection. The connection of the turbine housing 10 to the adjacent bearing section 26 takes place in this embodiment via a V tension band 36 (see FIG. 4). The bearing section 26 with the compressor housing is, in other words, carried by the turbine housing 10, which on its part can for example be attached to an engine manifold. By means of an additional defined dimensioning of a stop wall 34 of the housing module 20, a defined pretension between the housing module 20 and the partial housing is achieved, so that a high sealing quality is ensured in large operating ranges of the internal combustion engine. The vane structure 22 of the housing module 20 is stationary in the present embodiment and arranged between the spiral channel 12a on the bearing section and the receiving space 14. The housing module 20 or the vane structure 22 is preferably produced as a high-quality precise fine cast part, whereas the partial housing 18 may be a cost-efficient, relative coarse sand cast part. It can thereby be provided that the housing module 20 and the vane structure 22 are formed in several parts or in one piece. In the region of an exhaust gas outlet 38 of the partial housing 18 or of the turbine housing 10, a flow element 40 with a given inner contour is provided for the flow optimization.

FIG. 2 shows an enlarged schematic sectional view of the turbine housing according to the detail shown in FIG. 1. In connection with two-flow turbine housings 10 with vane structures 22, it is very important that a complete gas tightness of the two spiral channels 12a, 12b to each other is ensured. A back pressure $P_{31}$ in the first spiral channel 12a in front of the vane structure 22 is generally significantly larger than the back pressure $P_{32}$ in the second spiral channel 12b or in its free half nozzle passage 48b. The flow guidance in the two spiral channels 12a, 12b or the half nozzle passages 48a, 48b should thus be completely separate up to the turbine wheel 16. The housing module 20 comprises a sealing surface 42a for sealing the spiral channels 12a, 12b against each other, which sealing surface cooperates with a sealing surface 42b of an intermediate wall 44 of the turbine housing 10 arranged between the spiral channels 12a, 12b. The sealing surface 42a of the housing module 20 is pressed into the sealing surface 42b of the intermediate wall 44. Additionally, a sealing element 46 in the form of a piston ring is arranged between the sealing surfaces 42a, 42b of the housing module 20 and the intermediate wall 44. The housing module 20 further forms a wall region 50 separating the two half nozzles 48a, 48b in the face region of the vane structure 22, into which the sealing element was placed. The sealing surface 42a of the housing module and the sealing surface 42b of the intermediate wall can also be formed as a thread, in the form of a screw thread or in the form of a labyrinth seal.

FIG. 3 is a schematic sectional view of the partial housing module 20 and shows partially in sections part of the housing module 20 of the turbine housing 10 according to a second embodiment. In contrast to the turbine housing 10 shown in FIG. 2, the sealing element 46 presently arranged between the sealing surfaces 42a, 42b of the housing module 20 and the intermediate wall 44 is formed as a thermal compensation ring. As relatively large component temperature fluctuations can occur during the operation of the internal combustion engine, the sealing element 46 in the form of a compensation ring provides for an operation-safe balance of the thermal movements occurring in dependence on the geometric and design configuration at the material side between the intermediate wall 44 and the housing module 20. The sealing surface 42a of the housing module 20 is again additionally pressed toward the sealing surface 42b of the intermediate wall 44, so that a defined pretension in the cold state and thus a high sealing quality in large operating regions of the internal combustion engine are ensured.

Figure 4:
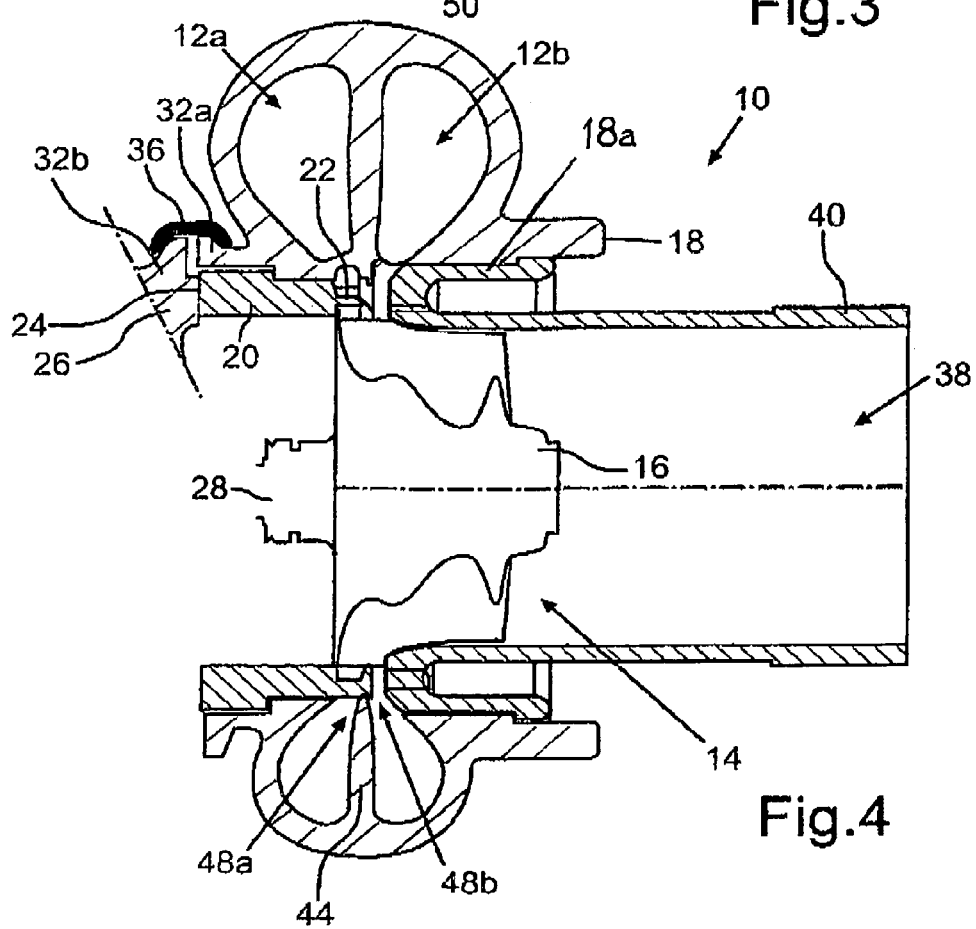
FIG. 4 is a schematic lateral sectional view of the turbine housing according to a further embodiment.

FIG. 4 shows schematically a lateral sectional view of the turbine housing 10 according to a further embodiment. The principal design features are the same as in the previous descriptions. In contrast to the previous embodiments, the partial housing 18 and the bearing section 26 shown in sections comprise the corresponding connection flanges 32a, 32b and are fastened to each other by means of the tension band 36. The housing module 20 is hereby controlled in its axial position and pre-tensioned via the flange attachment 18a of the partial housing 18 and the bearing section 26 and the wedge effect of the tension band 36. Alternatively, it can be provided in principle that the housing module 20 and the bearing section 26 are in operative connection via one or several components, so that the bearing section 26 only abuts the housing module 20 indirectly.

Figure 5:
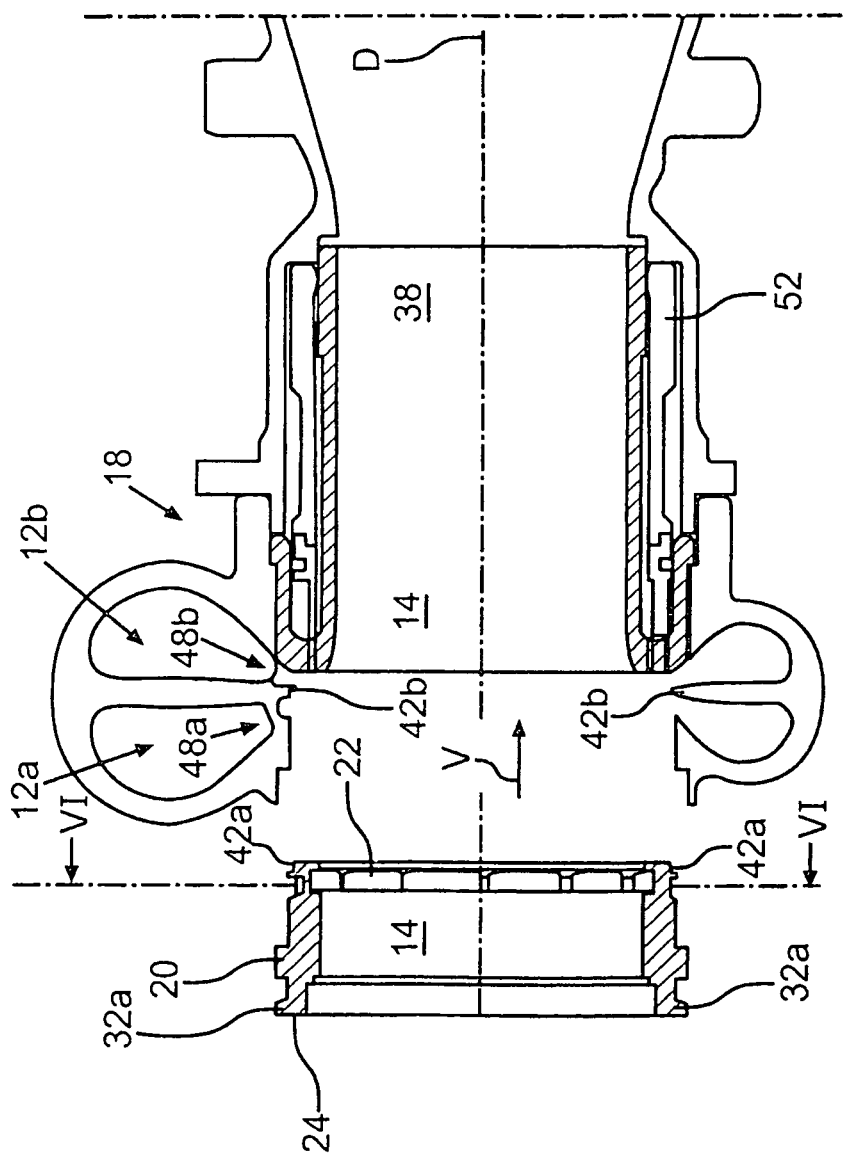
FIG. 5 is a schematic lateral sectional view of the turbine housing according to a further embodiment during the assembly.

FIG. 5 shows a schematic lateral sectional view of the turbine housing 10 according to a further embodiment during its assembly. For this, the partial housing 18 is provided first, which comprises in contrast to the previous embodiments in the region of its exhaust gas outlet 38 a vane structure sleeve 52 axially adjustable with regard to a rotational axis D of the turbine wheel 16, which louver vane structure sleeve can be moved into or out of the half nozzle 48b of the spiral channel 12b for providing a so-called turbobrake functionality. In order to be able to adapt the properties of the later exhaust gas turbocharger optimally to the requirements of the respective internal combustion engine, following the construction kit concept, the respectively most suitable housing module 20 is chosen from a number of different types of housing modules. As indicated by the arrow V the housing module is inserted along the rotational axis D, from the bearing section side into the partial housing 18 and fastened to the partial housing 18. This can be done as described previously, for example by a screw connection 30 or by a subsequent flanging of the bearing section 26.

Figure 6:
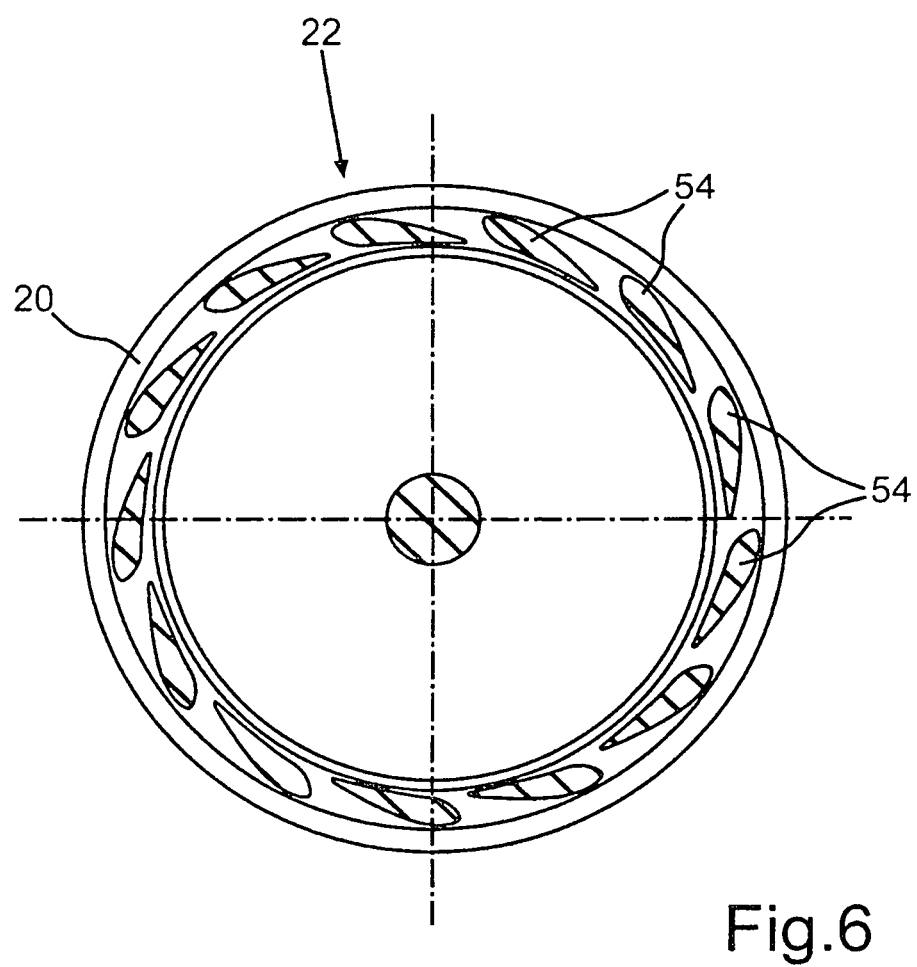
FIG. 6 is a schematic sectional view of the housing module along the sectional plane VI-VI shown in FIG. 5.

FIG. 6 shows, a schematically a sectional view of the housing module 20 taken along the sectional plane VI-VI shown in FIG. 5. As shown, the vane structure 22 comprises several guide vanes 54. The housing module 20 or its vane structure 22 is thereby designed to provide for an optimal exhaust gas recirculation capability of the associated engine.

Alternatively to the previously described embodiments, the modular construction of the turbine housing 10 of the partial housing 18 and the housing module 20 can also be used for single-flow turbines with only one spiral channel 12a. It can also be provided that the arrangement of the housing module takes place from the exhaust gas outlet side of the partial housing 18. It can further be provided that hollow blades can be moved from the exhaust gas outlet side of the partial housing 18 over the guide vanes 54 of the guide vane structure 22. Alternatively, vane structures can also be provided which can be moved between the guide vanes 54.

Figure 7:
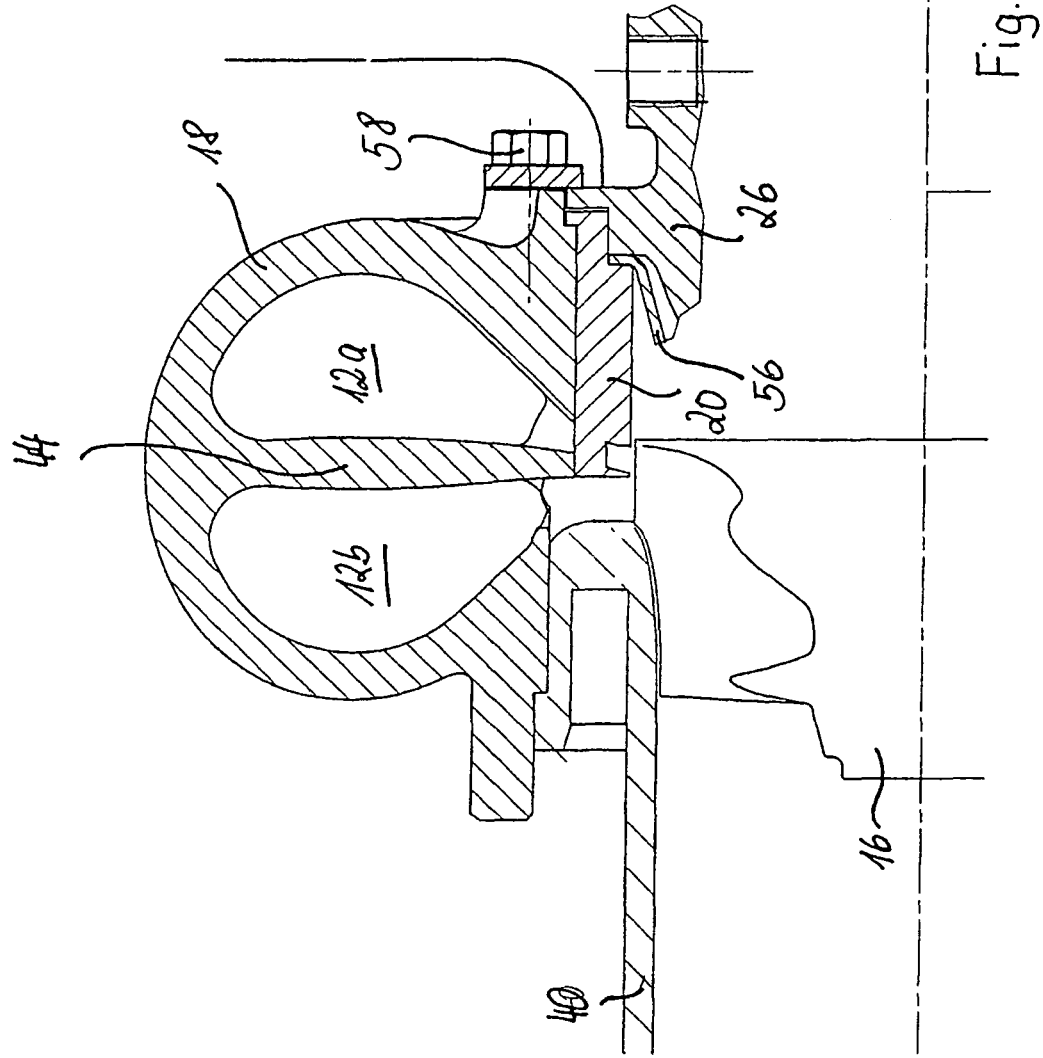
FIG. 7 is a schematic lateral sectional view of a turbine housing according to a further embodiment.

FIG. 7 shows the connection of the turbine housing 10 to the adjacent bearing section 26 in a further embodiment with the help of a screw connection 58, wherein a heat shield 56 is attached between an end of the housing module 20 positioned facing the bearing section 26 and an end of the bearing section 26 facing the housing module 20.

What is claimed is:

1. A turbine housing (10) for an exhaust gas turbocharger of an internal combustion engine, the turbine housing having at least one spiral channel (12a) to be coupled to an exhaust gas flow of an exhaust tract of the internal combustion engine, and a receiving space (14) for a turbine wheel (16) which is disposed downstream from the at least one spiral channel (12a) so as to be acted upon by exhaust gas of the internal combustion engine guided through the at least one spiral channel (12a) to the turbine wheel (16), the turbine housing (10) comprising at least one partial housing (18) including the at least one spiral channel (12a), and a housing module (20), which is fastened to the partial housing (18), and provided with a vane structure (22), which is disposed upstream of the receiving space (14) and an attachment surface (24) for accommodating a bearing section (26) of the exhaust gas turbocharger, one of the partial housing (18) and the housing module (20) having a connection flange (32a) in the region of the attachment surface (24), which connection flange (32a) is formed corresponding to a connection flange (32b) of the bearing section (26) for connection therewith.

2. The turbine housing (10) according to claim 1, wherein the housing module (20) is connected to the partial housing (18) by one of screws and a tension structure.

3. The turbine housing (10) according to claim 1, wherein at least one of the housing module (20) and/or the partial housing (18) are formed as a fine cast part.

4. The turbine housing (10) according to claim 1, wherein a second spiral channel (12b) is provided that can be coupled to the exhaust gas flow of the internal combustion engine.

5. The turbine housing (10) according to claim 4, wherein the vane structure (22) of the housing module (20) is arranged between at least one of the spiral channel (12a) and the receiving space (14) and between the further spiral channel (12b) and the receiving space (14).

6. The turbine housing (10) according to claim 4, wherein the housing module (20) comprises a sealing surface (42a) for sealing the spiral channels (12a, 12b) relative to each other, which sealing surface cooperates with a sealing surface (42b) of an intermediate wall (44) of the partial housing (18) arranged between the two spiral channels (12a, 12b).

7. The turbine housing (10) according to claim 6, wherein the sealing surface (42a) of the housing module (20) is pressed to the sealing surface (42b) of the intermediate wall (44) and that a sealing element (46) in the form of a piston ring or a thermal compensation ring is arranged between the sealing surfaces (42a, 42b) of the housing module (20) and the intermediate wall (44).

8. The turbine housing (10) according to claim 4, wherein a further vane structure (52) arranged between a spiral channel (12b) and the receiving space (14) in the region of an exhaust gas outlet (38) of the turbine housing is axially adjustable with regard to a rotational axis (D) of the turbine wheel (16) and a flow element (40) with a given inner contour.

9. The turbine housing (10) according to claim 1, wherein the housing module (20) consists of a material with a first expansion coefficient which is larger than a second heat expansion coefficient of a second material of which the partial housing (18) or the intermediate wall (44) consist.

10. An exhaust gas turbocharger for an internal combustion engine, with a turbine housing (10) which comprises at least one spiral channel (12a) that can be coupled to an exhaust gas flow of an exhaust gas tract of the internal combustion engine, and a receiving space (14), which is disposed downstream of the at least one spiral channel (12a), and in which a turbine wheel (16) is arranged that can be acted upon by the exhaust gas of the internal combustion engine, which flows through the at least one spiral channel (12a), and with a bearing section (26), in which a shaft (28) is supported, via which the turbine wheel (16) is coupled to a compressor wheel arranged in a compressor housing of the exhaust gas turbocharger in a rotationally fixed relationship with the turbine wheel (16), the turbine housing (10) comprising at least one partial housing (18), surrounding the receiving space (14), and a housing module (20), which is fastened to the partial housing (18) and which has a vane structure (22) disposed upstream of the receiving space (14) and an attachment surface (24), on which the bearing section (26) is supported at least indirectly, with the housing module (20) and the bearing section (26) being provided with corresponding connection flanges (32a, 32b) and being fastened to each other by means of one of a tension band (36) and a screw connection (58).

11. The exhaust gas turbocharger according to claim 10, wherein a heat shield (56) is attached between an end of the housing module (20) and positioned so as to face the bearing section (26) and an end of the bearing section (26) facing the housing module (20).

* * * * *